(12) United States Patent
Kuepper

(10) Patent No.: US 12,026,952 B2
(45) Date of Patent: Jul. 2, 2024

(54) MULTI-SENSORY MEASURING SYSTEM AND METHOD FOR TRANSPORTATION VEHICLE OPERATING SYSTEMS

(71) Applicants: VOLKSWAGEN AKTIENGESELLSCHAFT, Wolfsburg (DE); AUDI AG, Ingolstadt (DE); PORSCHE AG, Stuttgart (DE)

(72) Inventor: Philipp Nils Kuepper, Belmont, CA (US)

(73) Assignees: VOLKSWAGEN AKTIENGESELLSCHAFT (DE); AUDI AG (DE); PORSCHE AG (DE)

( * ) Notice: Subject to any disclaimer, the term of this patent is extended or adjusted under 35 U.S.C. 154(b) by 537 days.

(21) Appl. No.: 16/596,825

(22) Filed: Oct. 9, 2019

(65) Prior Publication Data

US 2021/0108966 A1     Apr. 15, 2021

(51) Int. Cl.
| | | |
|---|---|---|
| *G06V 20/56* | (2022.01) | |
| *G01J 5/00* | (2022.01) | |
| *G05D 1/00* | (2024.01) | |
| *G06V 10/143* | (2022.01) | |
| *G08G 1/01* | (2006.01) | |
| *G01J 5/48* | (2022.01) | |
| *G01J 5/80* | (2022.01) | |

(52) U.S. Cl.
CPC ............ *G06V 20/56* (2022.01); *G01J 5/0025* (2013.01); *G05D 1/0212* (2013.01); *G05D 1/0231* (2013.01); *G06V 10/143* (2022.01); *G08G 1/0104* (2013.01); *G01J 2005/0077* (2013.01); *G01J 5/485* (2022.01); *G01J 5/804* (2022.01)

(58) Field of Classification Search
CPC .......... G01J 5/0025; G01J 5/485; G01J 5/804; G01J 2005/0077; G05D 1/0212; G05D 1/0231; G05D 2201/0213; G08G 1/0104; G06V 10/143; G06V 20/56
See application file for complete search history.

(56) References Cited

U.S. PATENT DOCUMENTS

2008/0197284 A1* 8/2008 Ebenstein ............... G06T 7/136
                                                    348/E5.09
2010/0204896 A1* 8/2010 Biondo ............. B60W 50/0097
                                                    701/93

(Continued)

FOREIGN PATENT DOCUMENTS

CN         104885097 A        9/2015
CN         208076036 U        11/2018

(Continued)

OTHER PUBLICATIONS

CN-110562257-B Translation (Year: 2021).*

(Continued)

*Primary Examiner* — Kenneth J Malkowski
*Assistant Examiner* — Ibrahim Abdoalatif Alsomairy
(74) *Attorney, Agent, or Firm* — Barnes & Thornburg LLP

(57) ABSTRACT

A system and method are provided for observing conditions in an environment around a transportation vehicle and adjusting operation of the transportation vehicle in response to the observed conditions. The temperatures of features in the environment can be determined to compensate for varying conditions in the environment in operating the transportation vehicle.

4 Claims, 2 Drawing Sheets

(56) References Cited

U.S. PATENT DOCUMENTS

Figure 1:
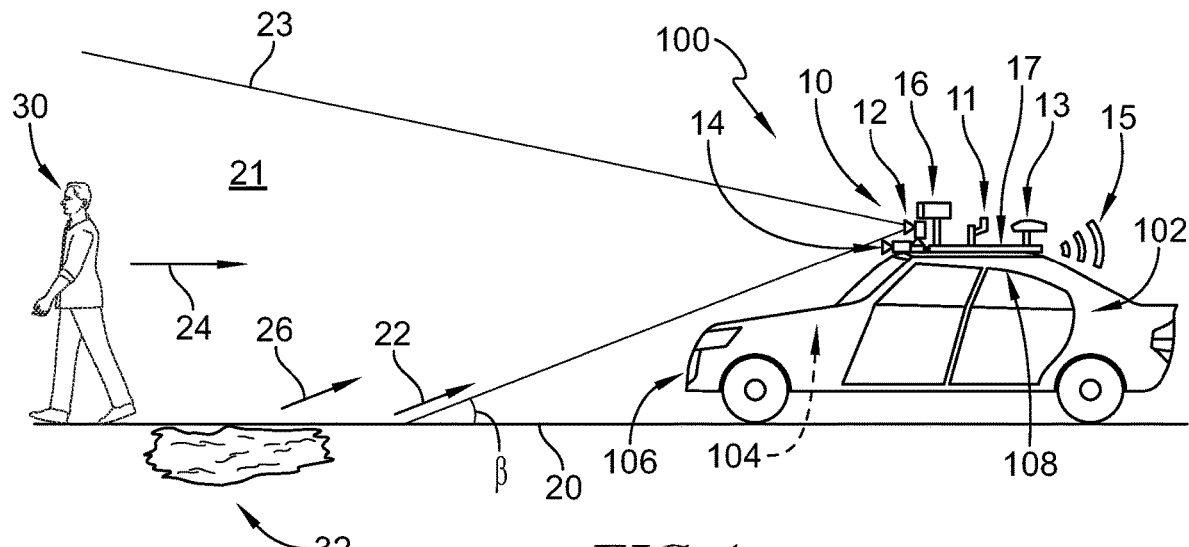

| | | | |
|---|---|---|---|
| 2010/0322480 A1* | 12/2010 | Banerjee | G06T 7/277 |
| | | | 382/103 |
| 2012/0139753 A1* | 6/2012 | Finlay | G08G 1/04 |
| | | | 340/936 |
| 2015/0344037 A1* | 12/2015 | Siegel | G06V 20/58 |
| | | | 73/9 |
| 2018/0004231 A1* | 1/2018 | Michini | G05D 1/0094 |
| 2018/0284274 A1 | 10/2018 | LaChapelle | |
| 2019/0226913 A1* | 7/2019 | Wang | G01J 5/605 |
| 2020/0017210 A1* | 1/2020 | Neubecker | B64D 1/22 |
| 2020/0172110 A1* | 6/2020 | Uemori | G01C 21/34 |

FOREIGN PATENT DOCUMENTS

| | | | | |
|---|---|---|---|---|
| CN | 110562257 B * | 4/2021 | | B60W 30/18 |
| DE | 102014224857 A1 | 6/2016 | | |
| EP | 1958821 A2 | 8/2008 | | |
| EP | 3671686 A1 | 6/2020 | | |
| WO | 2016076936 A2 | 5/2016 | | |
| WO | 2019035300 A1 | 2/2019 | | |
| WO | WO-2020117847 A1 * | 6/2020 | | G01J 3/2823 |

OTHER PUBLICATIONS

Translation of WO-2020117847-A1 (Year: 2020).*
Search Report and Written Opinion for International Patent Application No. PCT/EP2020/078137; Jan. 29, 2021.
Office Action; Chinese Patent Application No. 202080070883.7; Jul. 27, 2023.

* cited by examiner

MULTI-SENSORY MEASURING SYSTEM AND METHOD FOR TRANSPORTATION VEHICLE OPERATING SYSTEMS

BACKGROUND

The present disclosure relates to systems, components, and methodologies for measuring characteristics of an environment around a transportation vehicle. In particular, the present disclosure relates to systems, components, and methodologies for measuring characteristics of an environment around a transportation vehicle for use by systems in controlling operation of the transportation vehicle.

SUMMARY

In accordance with disclosed embodiments, a transportation vehicle may include a plurality of operating systems for controlling operation of the transportation vehicle. A multi-sensory measuring means may be provided for observing conditions in an environment around the transportation vehicle. Operation of the transportation vehicle may be adjusted in response to the observed conditions.

In some embodiments, thermal emission data from one or more features in the environment may be collected, one or more images of the environment including the one or more features may be collected, and ranging information from the transportation vehicle to the one or more features may be collected. The thermal emission data may be modified based on at least one of the one or more captured images and the collected ranging information. A temperature of the one or more features is determined based on the modified thermal emission data to allow the operating systems to adjust operation of the transportation vehicle in response to the observed conditions.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
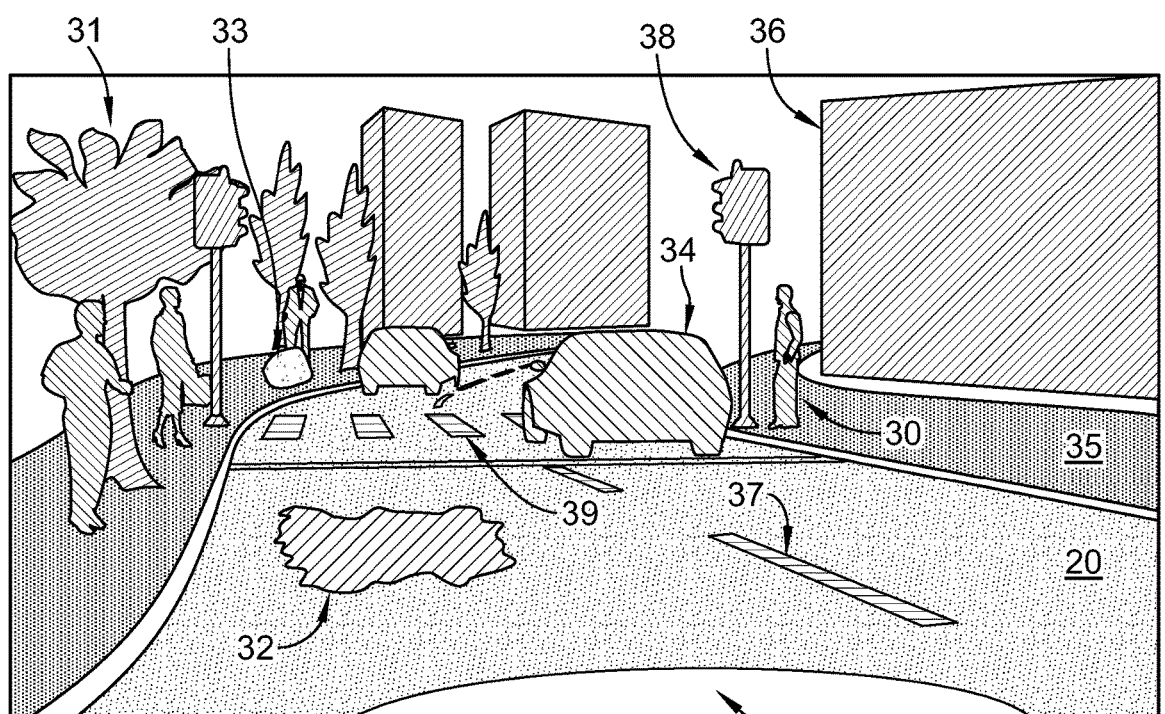
Figure 2:
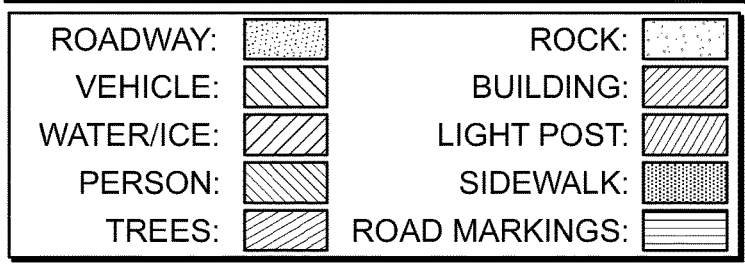
Figure 3:
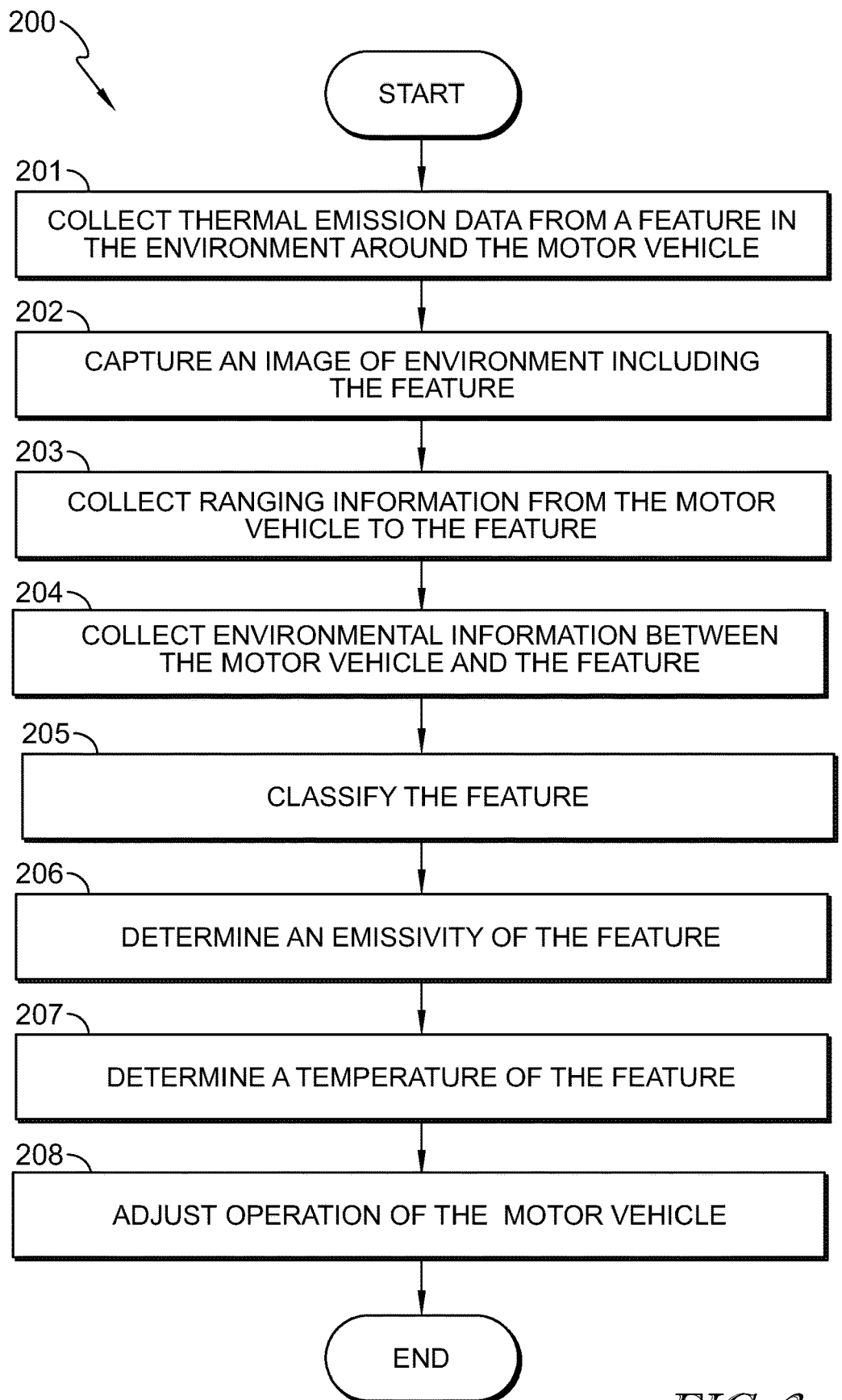

The present innovation is described in conjunction with disclosed embodiments illustrated and described in conjunction with the figures, wherein:

FIG. 1 is a diagrammatic side elevation view of a transportation vehicle in accordance with the present disclosure showing that the transportation vehicle includes a body, a plurality of operating systems, and an exemplary multi-sensory measuring system and suggesting that the measuring system is arranged to collect information from an environment around the transportation vehicle for use by the operating systems in controlling operation of the transportation vehicle;

FIG. 2 is a detail view of FIG. 1 taken from the perspective of the transportation vehicle showing separation and classification of various objects in the environment around the vehicle based on the information collected by the measuring system; and FIG. 3 is a diagrammatic flow chart of an exemplary method in accordance with the present disclosure for collecting information from an environment around the transportation vehicle for use by the operating systems in controlling operation of the transportation vehicle.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

A transportation vehicle 100 in accordance with the present disclosure is shown in FIG. 1. The transportation vehicle 100 includes a body 102 and a plurality of operating systems 104 for activating various functions of the transportation vehicle 100 and for controlling operation of the transportation vehicle 100. One or more of the operating systems 104 can be used for activating and controlling operation of a drive unit (not shown) of the transportation vehicle 100, such as a gas, electric, and/or hybrid motor(s), and/or stability and traction control operating systems, wheel power distribution systems, and assistive and/or autonomous driving systems of the transportation vehicle 100 among other functions and operations. The transportation vehicle 100 also includes an exemplary multi-sensory measuring system 10, which acts as a means for collecting information from an environment 21 around the transportation vehicle 100 for use by the operating systems 104 in controlling operation of the transportation vehicle 100 based on the characteristics of the environment 21. The multi-sensory measuring system 10 can also be used as a means for identifying and classifying objects in the environment 21 around the transportation vehicle 100, such as objects 30, 32 on or around a roadway 20 that the transportation vehicle 100 is traveling along.

In an illustrative embodiment, the multi-sensory measuring system 10 includes a thermal detector 12, an imaging device 14, and a ranging device 16 as shown in FIG. 1. The thermal detector 12 may be configured to detect thermal radiation 22, 24, 26 reflected and/or emitted from the roadway 20 and objects 30, 32 in the environment 21 around the transportation vehicle 100 and collect thermal emission data based on the detected thermal radiation. The imaging device 14 may be configured to capture images of the environment 21 around the transportation vehicle 100. The ranging device 16 is configured to collect ranging information for determining a distance from the transportation vehicle 100 to the roadway 20 and objects 30, 32. In some embodiments, the ranging information also allows for determination of a 3-dimensional profile of the roadway 20 and objects 30, 32. The multi-sensory measuring system 10 may be configured to determine a temperature and/or temperature profile of the roadway 20 and objects 30, 32 based on the thermal emission data. As further detailed herein, the captured images from the imaging device 14, ranging information from the ranging device 16, and/or other information collected by the multi-sensory measuring system 10 can be used to modify the thermal emission data in determining the temperatures and/or temperature profiles to compensate for environmental and characteristic effects on the thermal radiation 22, 24, 26.

In some embodiments, the thermal detector 12 may include a thermal imaging device, such as a Long Wave InfraRed (LWIR) or Far InfraRed (FIR) camera, configured to detect and capture images of radiation in the infrared (IR) spectrum (e.g., about 8 micrometer to about 14 micrometer wavelengths). In the illustrative embodiment shown in FIG. 1, the thermal detector 12 has a Field-Of-View (FOV) 23 extending ahead of the transportation vehicle 100 as shown in FIG. 1. An angle of incidence β for the FOV 23 relative to the roadway 20 or objects 30, 32 can also be used in modifying the thermal emission data. The imaging device 14 has a substantially similar FOV as the thermal detector 12 to allow coordination and comparison of the thermal emission data with the captured images.

In at least some embodiments, the imaging device 14 may include an RGB camera configured to capture images from radiation in the visible spectrum (e.g., about 380 nanometer to about 740 nanometer wavelengths). In some embodiments, the ranging device 16 may use Light Detection and Ranging (LiDAR), radar, stereoscopic cameras, or other processes for collecting the ranging data in determining distances.

In at least some embodiments, the multi-sensory measuring system 10 may further include one or more environmental sensors 11 as shown in FIG. 1. The environmental sensors 11 may be configured to measure and collect environmental information of the environment 21 around the transportation vehicle 100 for use in modifying the thermal emission data. For example, the environmental information can include one or more of temperature, humidity, air pressure, air density, particulate density, rain/snow fall, or other characteristic of the environment 21.

In at least some embodiments, the environmental sensors 11 can include a radar configured to measure atmospheric characteristics. In some embodiments, the multi-sensory measuring system 10 includes a geolocation unit 13, such as a GPS unit, and wireless connection unit 15 in addition or alternative to the environmental sensors 11. The geolocation unit 13 is configured to determine a location of the transportation vehicle 100, and the wireless connection unit 15 allows access to environmental data at that location for use in modifying the thermal emission data.

In at least some embodiments, the geolocation unit 13 and/or wireless connection unit 15 are integrated into one or more of the operating systems 104 and communicate with the multi-sensory measuring system 10.

Images from the imaging device 14 can be used to identify and classify features of the environment around the transportation vehicle 100 as shown in FIG. 2. For example, the images can be processed by semantic segmentation, neural networks, machine learning, and/or algorithms to identify and classify, for example, the roadway 20, people 30, water/ice 32, vehicles 34, buildings 36, light posts 38, vegetation (such as trees 34), other objects (such as rocks 33), and road markings 37, 39, among other features of the environment around the transportation vehicle 100.

In some embodiments, the thermal emission data, ranging information, and environmental information can be used in addition to the captured images for classifying the features. Identification of upcoming features ahead of the transportation vehicle 100 can be used to control operation of the transportation vehicle 100. For example, identifying a puddle of water 32 ahead of the transportation vehicle 100 can be used by the operating systems 104 in adjusting operation of the transportation vehicle 100, such as vehicle dynamics, driving speed, maximum deceleration and acceleration, maximum velocity through a curve, and finding trajectories on the roadway with maximum friction, among other adjustments, to improve performance of the transportation vehicle 100. The determined temperatures and/or temperature profiles can also be used to classify the area ahead as having ice 32 rather than liquid water for further or different adjustments to the operation of the transportation vehicle 100. The type of roadway 20 (e.g., gravel/dirt, cement, or blacktop) can be determined for use in adjusting operation of the transportation vehicle 100. The determined temperatures and/or temperature profiles along the roadway 20 can also be used in identifying areas with maximum traction, for example, in adjusting operation of the transportation vehicle 100. Identifying the arrangement of road markings 37, 39 can also be used in adjusting operation of the transportation vehicle 100.

In the illustrative embodiment, the classification of features in the environment around the transportation vehicle 100 can be used in identifying characteristics of those features for use in modifying the thermal emission data collected for those features. For example, each feature in the environment has a particular emissivity rating (i.e., ability to emit infrared energy) and the identification process can be used to determine a given feature's emissivity rating. In some embodiments, the multi-sensory measuring system 10 has a stored look-up table of emissivity ratings for a range of items likely to be encountered by the transportation vehicle 100, and identification of the item allows the multi-sensory measuring system 10 to determine the item's emissivity rating from the look-up table. In some embodiments, the multi-sensory measuring system 10 can determine an identified item's emissivity rating from a remote database. The determined emissivity rating can then be used to modify the thermal emission data to determine the temperature and/or temperature profile of the item.

In a dark environment, the imaging device 14 may not be effective at capturing useful images of the environment. In some embodiments, an output of the thermal detector 12 can provide a "heatmap" image of the environment 21 ahead of the transportation vehicle 100 that can be used in night-vision applications, for example. The ranging device 16 and environmental sensors 11, for example, can also effectively function without light input from the environment. Modifying the thermal emission data with the additional information collected by the multi-sensory measuring system 10 can clarify the resulting image. In some embodiments, one or more light sources, such as headlights of the transportation vehicle 100, can provide visible light to objects ahead for capturing images with the imaging device 14. In some embodiments, one or more light sources of the transportation vehicle 100 can provide light in a wavelength(s) outside of the visible spectrum but within the readable spectrum of the imaging device 14 for reflection off of objects in the environment to capture images with the imaging device 14.

At least some objects in the environment around the transportation vehicle 100 may be too small or too far away for effective temperature measurement. For example, in at least some embodiments, objects occupying less than about 10 adjacent pixels in the captured images and/or thermal emission data are ignored for purposes of determining a temperature for those objects and/or for purposes of classifying those objects.

The body 102 of the transportation vehicle 100 defines a front end 106 and a roof 108 as shown in FIG. 1. The multi-sensory measuring system 10 is illustratively mounted to the roof 108 of the transportation vehicle 100. In some embodiments, all or portions of the multi-sensory measuring system 10 can be mounted on or in the roof 108, the front end 106, or other area of the body 102 of the transportation vehicle 100. In some embodiments, one or more of the operating systems 104 controls operation of the multi-sensory measuring system 10.

In some embodiments, a controller 17 is included in the multi-sensory measuring system 10 for controlling operation of the multi-sensory measuring system 10, storing the collected information, using the collected information in determining characteristics of the environment as detailed herein, and communicating with the operating systems 104. In some embodiments, thermal emission data from the thermal detector 12, images from the imaging device 14, ranging information from the ranging device 16, environmental information from the environmental sensors 11, and/or environmental data is stored by the multi-sensory measuring system 10 and processed to determine the temperatures and/or temperature profiles of the roadway 20 and objects 30, 32. The outputs from the thermal detector 12, imaging device 14, and ranging device 16 may be synchronized to provide overlapping information on the environment for use in adjusting the thermal emission data used to determine the temperatures and/or temperature profiles of the roadway 20 and objects 30, 32. For example, in some embodiments, the information output from each of the thermal detector 12, imaging device 14, and ranging device 16 may be marked with a time stamp. The information used to adjust the thermal emission data can then be selected based on overlapping time stamps. In some embodiments, the outputs from each of the thermal detector 12, imaging device 14, and ranging device 16 are synchronized as the information is received for processing in real time (e.g., within about $\frac{1}{30}^{th}$ of a second in misalignment).

An exemplary method 200 in accordance with the present disclosure for collecting information from the environment around the transportation vehicle for use by the operating systems in controlling operation of the transportation vehicle is shown in FIG. 3. The method begins at 200 with a measurement operation 201 wherein thermal emission data is collected from one or more features in the environment around the transportation vehicle, such as the roadway and surrounding objects. For example, the thermal detector can detect relative levels of thermal radiation emitted and/or reflected from the roadway and surrounding objects and collect the thermal emission data from the detected thermal radiation. Control then proceeds to 202, at which an image of the environment is captured including the feature(s) providing the thermal emission data. For example, the imaging device may capture an image having a substantially overlapping FOV as the thermal detector such that the thermal emission data and captured image both include information about the feature. Control then proceeds to 203, at which Ranging information may be collected in a ranging operation, using the ranging device for example, for determining a distance the transportation vehicle to the feature(s) providing the thermal emission data.

In some embodiments, control may proceed to 204, at which environmental information may be collected, including, for example, characteristics of the environment between the transportation vehicle and the feature(s) providing the thermal emission data. In some embodiments, the environmental sensors may be configured to collect the environmental information. In some embodiments, the environmental information is gather through the wireless connection unit based on a location of the transportation vehicle, as determined using the geolocation unit, for example.

Control then proceeds to 205, at which the thermal emission data are classified. This may involve, for example, the captured image being processed to identify and classify the feature(s) as one of a range of items likely to be encountered by the transportation vehicle 100, such as, for example, the roadway, people, water/ice, vehicles, buildings, light posts, vegetation (such as trees), other objects (such as rocks), and road markings, among other features of the environment around the transportation vehicle.

Control then proceeds to 206, at which an emissivity of each classified feature is determined. This may be performed by, for example, the multi-sensory measuring system determining the feature's emissivity from a stored look-up table of emissivity ratings.

Control then proceeds to 207, at which a temperature of each feature is determined. As part of this operation, the thermal emission data can be modified to compensate for environmental and characteristic effects on the thermal radiation detected by the thermal detector for determining an "absolute" temperature(s) of the feature(s). For example, a distance from the transportation vehicle to a particular feature can affect the transmission of the thermal radiation from the feature to the thermal detector, and the ranging data can be used to modify the thermal emission data to compensate for these effects. In another example, environmental characteristics between the transportation vehicle and a particular feature can affect the transmission of the thermal radiation from the feature to the thermal detector, and the environmental information can be used to modify the thermal emission data to compensate for these effects. In another example, the emissivity of a particular feature can affect the ability of the feature to transmit the thermal radiation to the thermal detector, and the determined emissivity of the feature can be used to modify the thermal emission data to compensate for these effects. In the illustrative embodiment, the multi-sensory measuring system determines the temperature of each feature from the thermal emission data as modified by one or more of the ranging data, environmental information, and determined emissivity for the feature.

Control then proceeds to 208 at which one or more outputs from the multi-sensory measuring system may be used to adjust operation of the transportation vehicle. For example, the collected environmental information can indicate to the operating systems of the transportation vehicle that lower frictional conditions on the roadway exist ahead of the transportation vehicle, such as due to rain or snowfall, and prompt changes in the vehicle dynamics or speed to compensate for the lower frictional conditions. In another example, the determined temperature of the roadway and or water on the roadway can indicate to the operating systems of the transportation vehicle that lower frictional conditions on the roadway exist ahead of the transportation vehicle, such as due to ice or cold road temperatures, and prompt changes in the vehicle dynamics or speed to compensate for the lower frictional conditions. In another example, the classification of the roadway as being gravel/dirt can indicate to the operating systems of the transportation vehicle that lower frictional conditions on the roadway exist ahead of the transportation vehicle and prompt changes in the vehicle dynamics or speed to compensate for the lower frictional conditions. In some instances, no adjustments may be made based on the current operation of the transportation vehicle already being optimal for the detected conditions in the environment around the transportation vehicle.

In illustrative embodiments, multi-sensory measuring systems of the present disclosure provide technical utility in that they address the challenging technical problem of obtaining accurate radiometric temperature measurements of obstacles and objects in arbitrary environments around a transportation vehicle. In accordance with at least some embodiments, a multi-sensory measuring system of a transportation vehicle can be equipped with visible camera(s), LiDAR, a thermal camera, a GPS sensor, humidity, air pressure and temperature sensors as well as an internet connection to obtain atmospheric conditions in a given location. The combination of all of these sensors form a measurement system to provide more accurate radiometric temperature measurements of obstacles and infrastructure, such as the road surface, than a thermal camera by itself. The improved temperature measurements enable operational adjustments to the transportation vehicle making operation of the transportation vehicle safer and more reliable, such as during autonomous driving.

In illustrative embodiments, accurate radiometry information and the resulting temperature readings can provide an exact temperature of the road to obtain the road friction coefficient for adjusting vehicle dynamics, driving speed, maximum deceleration and acceleration, and/or maximum velocity through a curve of the transportation vehicle. The improved temperature readings can also be used for finding trajectories on the roadway with maximum friction. Accurate temperature readings also provide improved classification performance of detection algorithms, such as classifiers based on Convolutional Neural Networks or HOG features that purely base their predictions on the gradient information in an image. The reproducible absolute temperature measurements for further increased detection/classification performance, as a new form of reliable, absolute information for use in controlling operation of the transportation vehicle. Each transportation vehicle can provide feedback to infrastructure providers as well as crowd sourced databases about where a road might be icy or where there are defects in the road surface, for example.

In illustrative embodiments, the sensory inputs of the multi-sensory measuring system include a thermal camera (radiometry information), LiDAR/Stereocam (3D information of the observed object), a humidity sensor (atmospheric conditions in real time—air humidity), an air pressure sensor (atmospheric conditions in real time—air pressure), a temperature sensor (atmospheric conditions in real time—air temperature), GPS/localization module (current vehicle position), a visible camera (visual information about the environment in traditional RGB color profile), V2X/wireless communication module (information about current weather/climate conditions in local area), and radar (additional input for estimating atmospheric conditions), among others.

In illustrative embodiments, the multi-sensory measuring system compensates for various influencing factors that make temperature measurement challenging, especially in an automotive context where measurements are made at longer distance in arbitrary environments. For example, every material has a certain emissivity. This emissivity is largely dependent on the actual emitting material on the surface of the object. Typical materials of interest in an automotive context could include asphalt (with an emissivity of about 0.967), human skin (with an emissivity of about 0.98), water (with an emissivity of about 0.96), and snow (with an emissivity of about 0.08), among others. The features being observed do not only radiate their own thermal energy but also reflect thermal energy from the surroundings, and information about the environment and weather conditions can be used to compensate for the reflections.

In some embodiments, the thermal detector may include a LWIR camera with a polarimetric filter for distinguishing reflected radiation from emitted radiation. Atmospheric conditions, such as heavy snowfall under cold conditions, very low air pressure and low humidity (classic alpine scenarios), dense rain and fog, and/or high pressure, high humidity dry conditions, can influence transmission of thermal radiation, and collected information on the environment around the transportation vehicle can be used to compensate for the varying conditions. The effects of atmospheric conditions can be amplified over longer distances, and ranging date to the features being observed can be used to compensate.

In some embodiments, the thermal detector can be mounted higher in the transportation vehicle for improving the angle of incidence to the features being observed.

In illustrative embodiments, the multi-sensory measuring system of the transportation vehicle may be equipped with a thermal detector, such as a LWIR camera, to perceive long wave infrared radiation from about 8 to about 14 micrometer wavelengths, for example. The thermal camera is forward facing to observe the road surface as well as objects and obstacles on the road ahead of the transportation vehicle. The multi-sensory measuring system also has a modern RGB camera for the visible spectrum with an overlapping and/or identical field of view as the thermal camera. A ranging device, such as a LiDAR range finder, may be used to provide 3D range information about the scene observed by the RGB and LWIR cameras. These sensors can be used to effectively predict properties of the environment at over 50 m distance.

In illustrative embodiments, GPS may be used for localization of the transportation vehicle, and the obtained GPS coordinates can be used in combination with a wireless network connection to collect weather/climate information in a local area/an area ahead of the transportation vehicle. Air pressure, humidity, and temperature sensors can add further information about the atmosphere around the transportation vehicle. In some embodiments, it can be assumed that the atmosphere is approximately constant in a smaller area (about 200 m in radius) around the transportation vehicle.

In illustrative embodiments, the measurements from the thermal camera can be enriched by the other sensing modalities. Climate conditions perceived through the sensors and/or the network connection can be used to determine atmospheric conditions. LiDAR provides information about the distance to a given object observed in the view of the thermal camera. Further, LiDAR can also provide information about the local surface normal of a given pixel measurement of the thermal camera. That way the atmospheric conditions and geometric constraints of a given measurement can be compensated for their propagation through the atmosphere over the distance provided by LiDAR. This results in a more accurate temperature measurement.

In illustrative embodiments, the information from the RGB camera, LiDAR intensity information, and/or the gradients of the LWIR can be used to estimate the emissivity of a given object. The color information coupled with LiDAR intensity information provides information of the type of road surface. Based on this road surface type, an emissivity can be assigned to the road surface ahead of the vehicle. This relationship can either be modeled or learned through a machine learning algorithm. The emissivity can also be determined by classifying the scene using the RGB camera. Based on the semantic class of objects, the emissivity can be determined. For example, a road surface is often made from concrete, asphalt, pavement or gravel/dirt. With a successful classification of these surfaces based on RGB and/or LiDAR and/or (non-radiometric) LWIR measurements, the emissivity can be accurately determined. The segmented elements can be associated with a given emissivity.

It should be understood that some or all of the methodology explained above may be performed on, utilizing or with access to one or more servers, processors and associated memory which may be included, for example and without limitation, within a transportation vehicle, in particular, the processors providing control operations for the transportation vehicle. Unless specifically stated otherwise, and as may be apparent from the above description, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the terms "controller" and "processor" may refer to any device or portion of a device that processes electronic data from registers and/or memory to transform that electronic data into other electronic data that may be stored in registers and/or memory.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A transportation vehicle comprising:
   a plurality of operating systems for controlling operation of the transportation vehicle; and
   a multi-sensory measuring system for observing conditions in an environment around the transportation vehicle that includes a thermal detector, an imaging device, and a ranging device, wherein the thermal detector is configured to detect thermal radiation from features in an environment around the transportation vehicle and collect thermal emission data based on the detected thermal radiation, the imaging device is configured to capture one or more images of the environment including the one or more features, the ranging device is configured to collect ranging information for determining a distance from the transportation vehicle to the one or more features,
   wherein the multi-sensory measuring system is configured to modify the thermal emission data based on at least one of the one or more captured images and the collected ranging information, and to determine a temperature of the one or more features based on the modified thermal emission data to allow the operating systems to adjust operation of the transportation vehicle in response to the determined temperature of the one or more features,
   wherein the one or more features includes a roadway ahead of the transportation vehicle, and wherein the operating systems are configured to adjust at least one of vehicle dynamics, driving speed, maximum deceleration and acceleration, and maximum velocity through a curve in response to the determined temperature of the roadway, and
   wherein outputs from the thermal detector, imaging device, and ranging device are synchronized to provide overlapping information on the environment for use in modifying the thermal emission data used to determine the temperature of the roadway.

2. A method for operating a transportation vehicle, the method comprising:
   collecting thermal emission data from one or more features in an environment around the transportation vehicle via a thermal detector;
   capturing one or more images of the environment including the one or more features via an imaging device;
   collecting ranging information from the transportation vehicle to the one or more features via a ranging device;
   modifying the thermal emission data based on at least one of the one or more captured images and the collected ranging information;
   determining a temperature of the one or more features based on the modified thermal emission data; and
   adjusting operation of the transportation vehicle in response to the determined temperature,
   wherein the one or more features includes a roadway ahead of the transportation vehicle, and wherein the operating systems are configured to adjust at least one of vehicle dynamics, driving speed, maximum deceleration and acceleration, and maximum velocity through a curve in response to the determined temperature of the roadway, and
   wherein outputs from the thermal detector, imaging device, and ranging device are synchronized to provide overlapping information on the environment for use in modifying the thermal emission data used to determine the temperature of the roadway.

3. The transportation vehicle of claim 1, wherein the multi-sensory measuring system is further configured to mark the information output from each of the thermal detector, imaging device, and ranging device with a time stamp and to select the overlapping information on the environment based on the overlapping time stamps to determine the temperature of the roadway.

4. The method of claim 2, further comprising:
   marking the information output from each of the thermal detector, imaging device, and ranging device with a time stamp; and
   selecting the overlapping information on the environment based on the overlapping time stamps to determine the temperature of the roadway.

* * * * *